United States Patent [19]

Johnson et al.

[11] Patent Number: 4,890,163
[45] Date of Patent: Dec. 26, 1989

[54] INTERRUPTING A TRANSITION SEQUENCE BETWEEN VIDEO SOURCES

[75] Inventors: Brion Johnson; Michael R. Kesti, both of Nevada City; Keith Y. Reynolds, Grass Valley, all of Calif.

[73] Assignee: Grass Valley Group, Inc., Grass Valley, Calif.

[21] Appl. No.: 178,106

[22] Filed: Apr. 6, 1988

[51] Int. Cl.⁴ .............................................. H04N 9/74
[52] U.S. Cl. .................................... 358/181; 358/185
[58] Field of Search ............ 358/181, 185, 160, 21 R, 358/183, 22; 360/14.1

[56] References Cited

U.S. PATENT DOCUMENTS 4,835,613 5/1989 Johnson ............................. 358/181

OTHER PUBLICATIONS

Operators Handbook of Model 100 Video Switcher, Grass Valley Group, 1983.

Primary Examiner—James J. Groody
Assistant Examiner—Mark R. Powell
Attorney, Agent, or Firm—Francis I. Gray

[57] ABSTRACT

A transition interrupt for a video switcher which occurs at any point during or just prior to a transition between a program bus source and a preset bus source replaces the source on the preset bus with a new source. The program bus executes a cut or fade to black of the current source, and then the new source from the preset bus is switched to the program bus so that the new source is now on the program bus at black. The program bus is held at black, if necessary, until any necessary initial activation sequence is completed, such as preroll for a tape or cassette recorder, and then brought up from black to complete the new transition due to the transition interrupt.

3 Claims, 2 Drawing Sheets

INTERRUPTING A TRANSITION SEQUENCE BETWEEN VIDEO SOURCES

BACKGROUND OF THE INVENTION

The present invention relates to video switchers and their control systems, and more particularly to a transition interrupt mechanism for smoothly altering a transition sequence for a video switcher without presenting a visual anomaly to a viewer of program material.

Continuous television signals in a broadcast day are typically composed of hour long or half hour long program segments, which are in turn composed of program material interspersed with break material. This material may come from network feeds, satellite feeds, studio cameras, video tape and cassette recorders, film chains, or other sources. Break material may be in the form of commercial announcements, public service announcements, promotional material, station identifications, etc. A typical program would start with a television program leader followed by a break sequence with three or four messages, a first part of the television program, another break sequence, a second part of the television program, another break sequence, and a television program closing. Each portion of the program may come from a different source so that there has to be some transition from one source to the next. The various transition types include cuts (takes), fades and mixes.

Many kinds of sources require some activation prior to actual availability of the program material from that source, the activation is started prior to the actual transition time. This activation is termed preroll since it is most commonly associated with the starting of tape motion on a video tape recorder in order to allow time for the tape motion and other mechanisms of the machine to reach a stable condition, to allow the resulting video signal to be free from breakup or other imperfections, and to be locked in synchronism to the video signal timing requirements of subsequent station equipment. A source that requires this preroll time is often termed a rolling source, and similarly a source not requiring this time is often termed a non-rolling source.

In many cases an operator chooses the next source to be used, then directly initiates all transitions from general or specific directions that he has received. This mode of operation is termed manual operation. On occasion an operator selects the wrong source, or finds that the source has not been prepared for use, i.e., the wrong tape has been mounted, or has other problems that become apparent while the source is still on the preset bus during the preroll time before the transition has been completed.

In some cases the source is chosen automatically by an automation or event programming system, and the operator just has the responsibility of initiating the transition. This mode of operation is termed semi-automatic operation. All of the problems that are inherent in manual operation may still occur, and new problems relating to mislinking event files or other characteristics of the programming system may also occur.

In yet other cases the source is chosen automatically by an automation or event programming system, and the transition is initiated also automatically. This mode of operation is termed full automatic operation. In addition to all of the problems aforementioned, the timing of the beginning or ending of the material may not be correct, and the operator may need to override it manually. The operator monitors the automatic operation of the video switcher system to assure that all sources are available and operating correctly at all times, and especially prior to transitions.

If in any of these modes while in a transition the operator sees that the new video source is inoperative for any reason, the operator has a desire to change sources to an alternative source. However some prior art video switchers lock the operator out of the controls for the duration of the transition, with the result that the bad source is aired, causing visual anomalies for a viewer of the program. Other prior art video switchers allow operator access to all controls, but activating the controls causes an abrupt source change or other abrupt change that again appears as an anomaly for the viewer of the program.

What is desired is a technique for interrupting a transition at any time without providing a visual anomaly to a viewer.

SUMMARY OF THE INVENTION

Accordingly the present invention provides a transition interrupt mechanism for a video switcher system which allows an operator to smoothly alter a transition on the video switcher without presenting a visual anomaly to a viewer. The activation of a preset source or skip next event button, the event being supplied from an automation or event programming system, causes a current source to complete its fade to black at the start of a transition period, and then brings up the newly selected source after a suitable source activation period while holding the program bus at black, if necessary, until the new source is ready to be viewed. Thus the transition may be interrupted and smoothly changed to another source with only a short black interval at worst case observed by a viewer.

The objects, advantages and other novel features of the present invention are apparent from the following detailed description when read in conjunction with the appended claims and attached drawing.

DESCRIPTION OF THE PREFERRED EMBODIMENT

Figure 1:
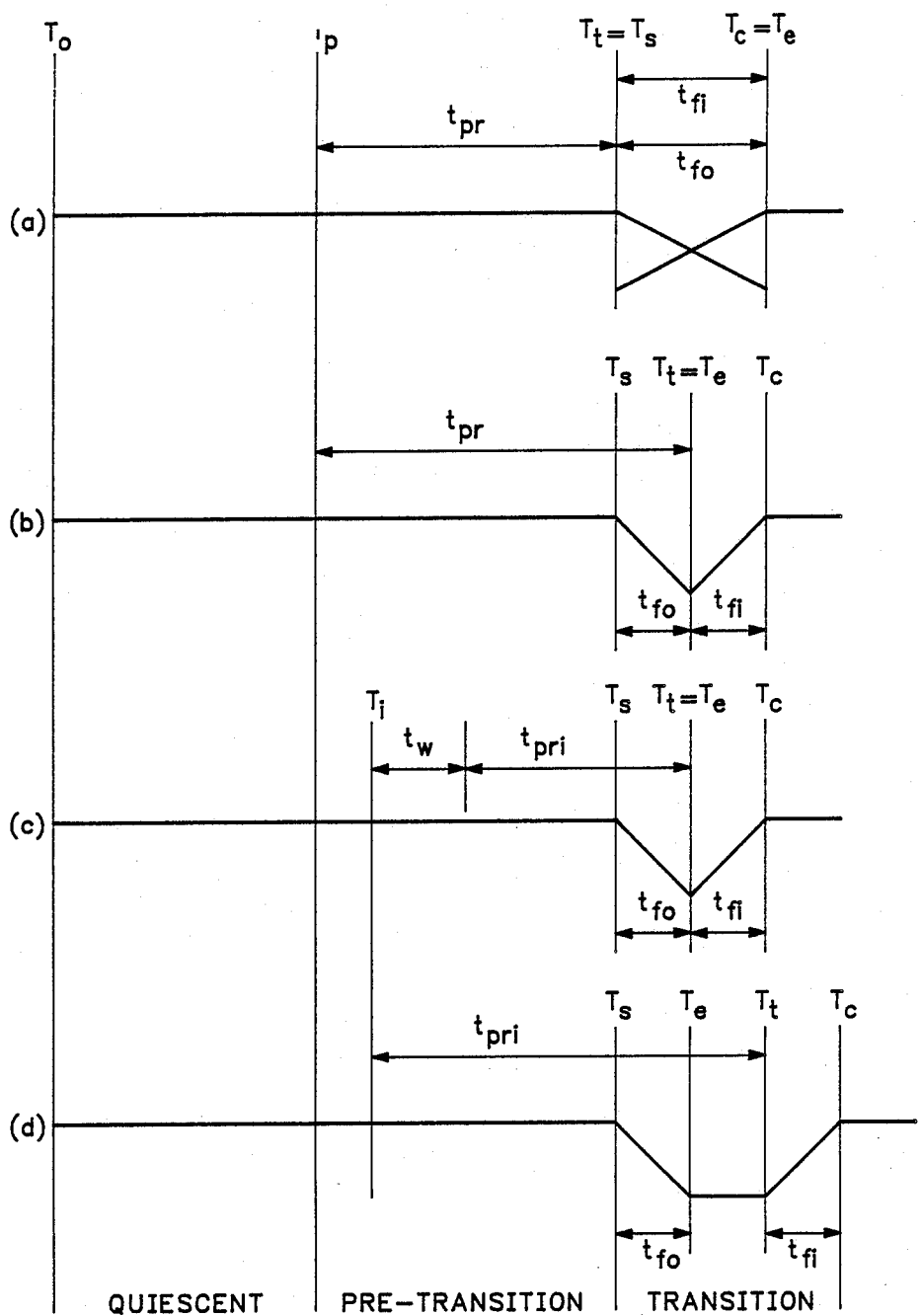
FIG. 1 is a timing diagram of various normal mix and fade transitions indicating the effect of a transition interrupt according to the present invention.

Referring now to FIG. 1 different transition types for a video switcher are shown together with the effect of a transition interrupt. To represents an arbitrary reference time prior to a transition. Tp represents the start of a pre-transition period, the period between To and Tp being a quiescent period. The pre-transition period is that amount of time prior to transition during which the next source needs to be activated, such as preroll for video tape and cassette recorders. At time Ts a transition period starts which has the effect of fading an image from a source currently on a program bus to black. At time Te the program bus image has reached black. At time Tt the next source from a preset bus is transferred to the program bus and starts to fade up from black. The transition is complete at time Tc. The difference in time between the transition start Ts and the old end time Te is the fade out time $t_{fo}$, and the difference in time between the transition time Tt and the transition complete time Tc is the fade in time $t_{fi}$. For a cut or take the fade out or fade in time is zero, otherwise the fade out and fade in times have a non-zero value previously entered into the video switcher's control panel. The length of the pre-transition period is a function of the required activation period for the next video source and equals the longest preroll required back from the transition time Tt. The preroll time $t_{pr}$ equals the length of the pre-transition period for normal transitions, and the preroll time $t_{pri}$ equals the length of the pre-transition period plus some additional time for transitions that are interrupted.

FIG. 1(a) illustrates a mix transition type where the transition start time Ts and the transition time Tt are equal, i.e., the current source starts to fade to black at the same time that the next source starts to fade up from black. In FIG. 1(b) the current source fades to black prior to the next source fading up from black, which represents all other kinds of normal transitions except the mix represented in FIG. 1(a). The pre-transition period equals the preroll time $t_{pr}$ minus the fade out time. For a cut from one source to the next the transition start time Ts equals the transition time Tt and the transition complete time Tc, i.e., the fade out and fade in times are zero. Of course various combinations of these transition types may be used with varying fade out and fade in times.

Two concepts are important to the understanding of the present invention. First, the source material currently on the program bus has a fixed length, and nothing is to be gained by extending the time that its signal is used since noise, prior cuts or other unusable information comes from the source immediately after its originally scheduled end time, shown in FIG. 1 as time Te. For this reason black is the signal of choice to be used to fill any extra time. Second, the preroll sequence is a fixed amount of time back timed from the point of first usable signal from the source. Using the source before the correct preroll time has completed results in the same kinds of non-usable signal as explained above, and using the signal after the preroll time has completed results in loss of part of the desired material which is undesirable at all times, especially during a commercial message.

FIG. 1(c) shows the effect of a transition interrupt that occurs at time Ti during the pre-transition time with a specific preroll $t_{pri}$ that is shorter than or equal to the remaining time until transition time Tt. In this case the preroll is started after a wait time $t_w$, which may be zero, and completes in good order for the new source to come up on the original pre-interrupt schedule. The transition is not impacted by the occurrence of a transition interrupt, and no anomalies are viewable.

FIG. 1(d) shows the opposite case where the preroll time $t_{pri}$ is longer than the time available for it to occur. The old source is taken to black at Te and remains in black until the preroll completes at time Tt, again with no viewable anomaly.

A further case, not shown, is when the interrupt occurs as the new source is coming up on the program bus. In this case the old source is cut to black and then the rest of the sequence is as in FIG. 1(d). Although this cutting action produces an anomaly, the artifact is less in duration than would occur had the corrective action not taken place so quickly.

Figure 2:
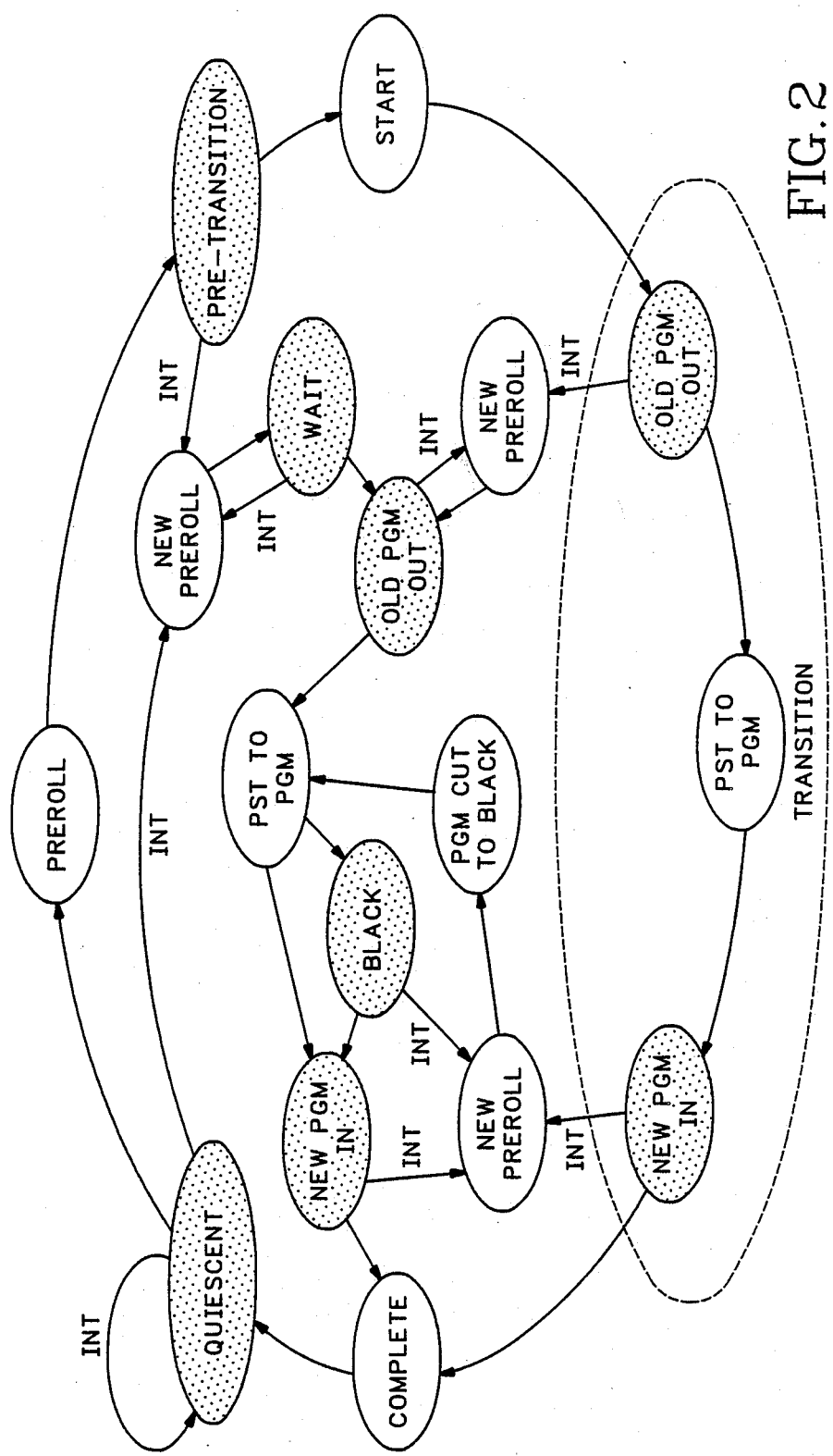
FIG. 2 is a state diagram for processing a transition interrupt according to the present invention.

A normal transition sequence is shown in the state diagram of FIG. 2 as the outer circle of events connected by the heavy path. The shaded states indicate states where some time may be spent, while the unshaded states are transitory states. Starting from an initial quiescent state, when an operator initiated or automatic transition sequence starts, a preroll sequence is initiated for the source on the preset bus PST and the normal pre-transition state is entered. If the preroll time is zero, such as for network feeds, cameras and the like, then the pre-transition state is just passed through, i.e., is like a transitory state. After the pre-transition period the transition starts and the video currently on the program bus PGM is cut or faded out as a normal transition state is entered. When the old PGM is at black, the source on the preset bus is switched to the program bus to become the new program source and the new PGM is cut in or faded up from black. When the transition is complete, the quiescent state is entered until the next transition is initiated. It is readily apparent that the states within the transition state overlap in the case of a mix.

When a transition interrupt occurs, either manually under operator control or automatically by monitoring the preset bus for signal quality or source error signals, the source connected to the preset bus immediately changes to a new source as determined by the transition interrupt. When in the quiescent state and either the automatic transition is disabled or the time is prior to the automatic transition start for the new preset source, then there is no state change. However if the automatic transition is enabled and the time to initiate the new preset automatic transition has occurred, or the transition has been manually initiated, then the new preset preroll sequence starts and a wait state is entered similar to the normal pre-transition state. The occurrence of a transition interrupt in either the pre-transition or wait states brings a new source onto the preset bus and initiates the preroll sequence for that new source, returning to the wait state. Thus the present invention is recursive, and any number of interrupts may follow each other. When the time Ts occurs to start the transition, the old source on the program bus is cut out or faded to black. A transition interrupt during this time at the beginning of a transition, either a normal transition or a transition due to a prior transition interrupt, again starts a new source preroll sequence and continues to finish the cut or fade to black of the old program source PGM already initiated. After the odd program is at black, the source on the preset bus is transferred to the program bus to be the new PGM and either the new PGM waits in black until the preroll is complete or the new PGM cuts or fades in when the new PGM preroll is complete. A transition interrupt occurring while waiting in black or during the new PGM cut or fade in begins a new preset preroll sequence, cuts the new PGM to black, switches the now new preset to the program bus and returns to the wait in black or new PGM cut or fade in state. When the transition is complete, whether due to transition interrupts or a normal transition, the quiescent state is entered.

The transition interrupt may take the form of either a direct selection of a new source for the preset bus or a skip, or NEXT+1, to the next source specified in an automatic program sequence of transitions by an automation or event programming system. Regardless of the type of transition interrupt, activation of the interrupt causes a mix function to change to a fade/fade function which reverts to the mix function when the quiescent state is reentered for subsequent transitions. Where the new source is selected for the preset bus, that source is immediately placed on the preset bus upon interrupt activation and the preroll period is entered. Where the NEXT+1 function is used, the source for the next transition, skipping the source for the immediately upcoming transition which is interrupted, is placed on the preset bus.

Thus the present invention provides a method for interrupting video transitions in a video switcher by placing a new next source on a preset bus while taking the current source on the program bus to black as scheduled, and then holding at black, if necessary, until the preroll for the new preset source is completed before switching the preset bus to the program bus for cut or fade in of the new source.

What is claimed is:

1. A method of interrupting a transition from a current source on a program but to a next source on a preset bus regardless of the time within the transition at which the interrupt occurs comprising the steps of:

in response to the interrupt selecting a new next source for placement on the preset bus and initiating necessary activation of the new next source;

reducing the current source to black;

switching the new next source to the program bus from the preset bus so that the new next source becomes a new current source; and then bringing up the new current source on the program bus from black when the activation is complete.

2. A method as recited in claim 1 further comprising the steps of:

cutting the new current source to black in response to a subsequent interrupt occurring during the bringing up step; and repeating the selecting, switching and bringing up steps.

3. A method as recited in claim 1 further comprising the step of initiating the interrupt automatically in response to an error signal indicating a next source anomaly on the preset bus.

* * * * *